US012748759B2

(12) United States Patent
Payagond et al.

(10) Patent No.: US 12,748,759 B2
(45) Date of Patent: Sep. 29, 2026

(54) SYSTEM AND METHOD FOR PROCESSING DATA USING A STORAGE DEVICE INCLUDING A PROCESSING CIRCUIT

(71) Applicant: Samsung Electronics Co., Ltd., Suwon-si (KR)

(72) Inventors: Rajashekhar Hanumantappa Payagond, San Diego, CA (US); Kedar Patwardhan, Urbana, IL (US); Nithya Ramakrishnan, San Jose, CA (US); Mayank Saxena, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/523,770

(22) Filed: Nov. 29, 2023

(65) Prior Publication Data

US 2025/0068632 A1 Feb. 27, 2025

Related U.S. Application Data

(60) Provisional application No. 63/533,973, filed on Aug. 22, 2023.

(51) Int. Cl.
*G06F 16/00* (2019.01)
*G06F 16/2455* (2019.01)
*G06F 16/2457* (2019.01)

(52) U.S. Cl.
CPC .... *G06F 16/24553* (2019.01); *G06F 16/2457* (2019.01)

(58) Field of Classification Search
CPC .... G06F 16/248; G06F 16/21; G06F 11/2094; G06F 16/285; G06F 16/951; G06F 16/245; G06F 3/061; G06F 16/22; G06F 16/24542; G06F 16/217; G06F 16/273; G06F 3/064; G06F 16/27; G06F 16/00; G06F 16/182; G06F 16/24; G06F 16/26; G06F 16/287;
(Continued)

(56) References Cited

U.S. PATENT DOCUMENTS

| | | | |
|---|---|---|---|
| 9,967,146 | B2 | 5/2018 | Franke et al. |
| 11,139,991 | B2 | 10/2021 | Doshi et al. |

(Continued)

FOREIGN PATENT DOCUMENTS

| | | | |
|---|---|---|---|
| CN | 104618484 A | 5/2015 | |
| WO | WO 2012/101552 A3 | 8/2012 | |

OTHER PUBLICATIONS

Raghunath, A. et al. " On Evolving Software Defined Storage Architecture," 2020 IEEE International Conference on Cloud Computing Technology and Science, pp. 57-64 (2020).

*Primary Examiner* — Shyue Jiunn Hwa
(74) *Attorney, Agent, or Firm* — Womble Bond Dickinson (US) LLP

(57) ABSTRACT

A system and method for accelerating algorithms using disaggregated computational storage. In some embodiments, the system includes: a non-volatile storage device, including: non-volatile memory; and a processing circuit, wherein: the non-volatile memory of the non-volatile storage device stores a first part of an object portion; and the processing circuit of the non-volatile storage device is configured: to receive a data structure, the data structure defining a query; and to execute an operation, on the first part of the object portion, based on the query.

12 Claims, 5 Drawing Sheets

(58) Field of Classification Search
CPC ...... G06Q 10/06; G06Q 10/10; G06Q 10/107; H04L 63/105; H04L 63/0227
See application file for complete search history.

(56) References Cited

U.S. PATENT DOCUMENTS

| | | | |
|---|---|---|---|
| 11,388,054 | B2 | 7/2022 | Guim Bernat et al. |
| 11,444,851 | B2 | 9/2022 | Young |
| 11,513,977 | B2 | 11/2022 | Kang et al. |
| 2006/0059173 | A1* | 3/2006 | Hirsch ................ G06F 16/2455 |
| 2017/0140007 | A1* | 5/2017 | Agarwal ............... G06F 16/248 |
| 2020/0186592 | A1 | 6/2020 | Bernat et al. |
| 2021/0144517 | A1 | 5/2021 | Guim Bernat et al. |
| 2022/0113790 | A1 | 4/2022 | Doshi et al. |
| 2022/0188028 | A1 | 6/2022 | Mesnier et al. |

* cited by examiner

SYSTEM AND METHOD FOR PROCESSING DATA USING A STORAGE DEVICE INCLUDING A PROCESSING CIRCUIT

CROSS-REFERENCE TO RELATED APPLICATION(S)

The present application claims priority to and the benefit of U.S. Provisional Application No. 63/533,973, filed Aug. 22, 2023, entitled "ACCELERATING NEAR REAL-TIME ALGORITHMS USING DISAGGREGATED COMPUTATIONAL STORAGE", the entire content of which is incorporated herein by reference.

FIELD

One or more aspects of embodiments according to the present disclosure relate to data processing, and more particularly to a system and method for accelerating algorithms using disaggregated computational storage.

BACKGROUND

In various computing systems, data may be stored in persistent storage, in persistent storage devices. In modern computing systems, various challenges may be associated with such storage, related to the need to accelerate data processing. Such challenges may include ones associated with increased storage volumes, bandwidth limits affecting the communications with storage devices, and challenges providing processing capabilities commensurate with large volumes of stored data.

It is with respect to this general technical environment that aspects of the present disclosure are related.

SUMMARY

According to an embodiment of the present disclosure, there is provided a system, including: a non-volatile storage device, including: non-volatile memory; and a processing circuit, wherein: the non-volatile memory of the non-volatile storage device stores a first part of an object portion; and the processing circuit of the non-volatile storage device is configured: to receive a data structure, the data structure defining a query; and to execute an operation, on the first part of the object portion, based on the query.

In some embodiments: the non-volatile memory of the non-volatile storage device stores a second part of the object portion; and the processing circuit of the non-volatile storage device is configured: to receive the data structure; and to execute an operation, on the second part of the object portion, based on the query.

In some embodiments, the non-volatile memory of the non-volatile storage device stores an erasure code part associated with the first part of the object portion.

In some embodiments, the query is a query for selecting one or more data elements.

In some embodiments: the query is a query for selecting one or more data elements; the data structure includes a first field having a first value; and the first value defines a first characteristic of the query.

In some embodiments: the query is a query for selecting one or more data elements; the data structure includes a first field having a first value; the first value defines a first characteristic of the query; and the first characteristic is an operation of the query.

In some embodiments: the query is a query for selecting one or more data elements; the data structure includes a first field having a first value; the first value defines a first characteristic of the query; the first characteristic is an operation of the query; and the operation includes one or more of counts, sums, averages, minimums and maximums.

In some embodiments: the object portion includes a value of a first attribute; the query is a query for selecting one or more data elements; the data structure includes a first field having a first value; the value of the first field defines a first characteristic of the query; and the first characteristic is a data type of the value of the first attribute.

In some embodiments: the query is a query for selecting one or more data elements; the data structure includes a first field having a first value; the first value defines a first characteristic of the query; and the first characteristic is a compare operation of the query.

In some embodiments: the query is a query for selecting one or more data elements; the data structure includes a first field having a first value; the first value defines a first characteristic of the query; the first characteristic is a compare operation of the query; and the compare operation is selected from the group consisting of equal to, greater than, greater than or equal to, less than, less than or equal to, and contains.

In some embodiments: the query is a query for selecting one or more data elements; the data structure includes a first field having a first value; the first value defines a first characteristic of the query; and the first characteristic is a threshold value of the query.

According to an embodiment of the present disclosure, there is provided a non-volatile storage device, including: non-volatile memory; and a processing circuit, the non-volatile memory storing a first part of an object portion; the non-volatile memory further storing instructions that, when executed by the processing circuit, cause the processing circuit to perform a method, the method including: receiving a data structure, the data structure defining a query; and executing an operation, on the first part of the object portion, based on the query.

In some embodiments, the non-volatile memory of the non-volatile storage device stores an erasure code part associated with the first part of the object portion.

In some embodiments, the query is a query for selecting one or more data elements.

In some embodiments: the query is a query for selecting one or more data elements; the data structure includes a first field having a first value; and the first value defines a first characteristic of the query.

In some embodiments: the query is a query for selecting one or more data elements; the data structure includes a first field having a first value; the first value defines a first characteristic of the query; and the first characteristic is an operation of the query.

In some embodiments: the query is a query for selecting one or more data elements; the data structure includes a first field having a first value; the first value defines a first characteristic of the query; the first characteristic is an operation of the query; and the operation is selected from the group consisting of counts, sums, averages, minimums and maximums.

According to an embodiment of the present disclosure, there is provided a method, including: receiving, by a processing circuit of a non-volatile storage device, a data structure, the data structure defining a query; and executing, by the processing circuit of the non-volatile storage device, an operation, on a first part of an object portion, based on the query, wherein the non-volatile storage device includes non-volatile memory storing the first part of the object portion.

In some embodiments: the query is a query for selecting one or more data elements; the data structure includes a first field having a first value; and the first value defines a first characteristic of the query.

In some embodiments: the query is a query for selecting one or more data elements; the data structure includes a first field having a first value; the first value defines a first characteristic of the query; and the first characteristic is an operation of the query.

BRIEF DESCRIPTION OF THE DRAWINGS

These and other features and advantages of the present disclosure will be appreciated and understood with reference to the specification, claims, and appended drawings wherein:

DETAILED DESCRIPTION

Figure 1A:
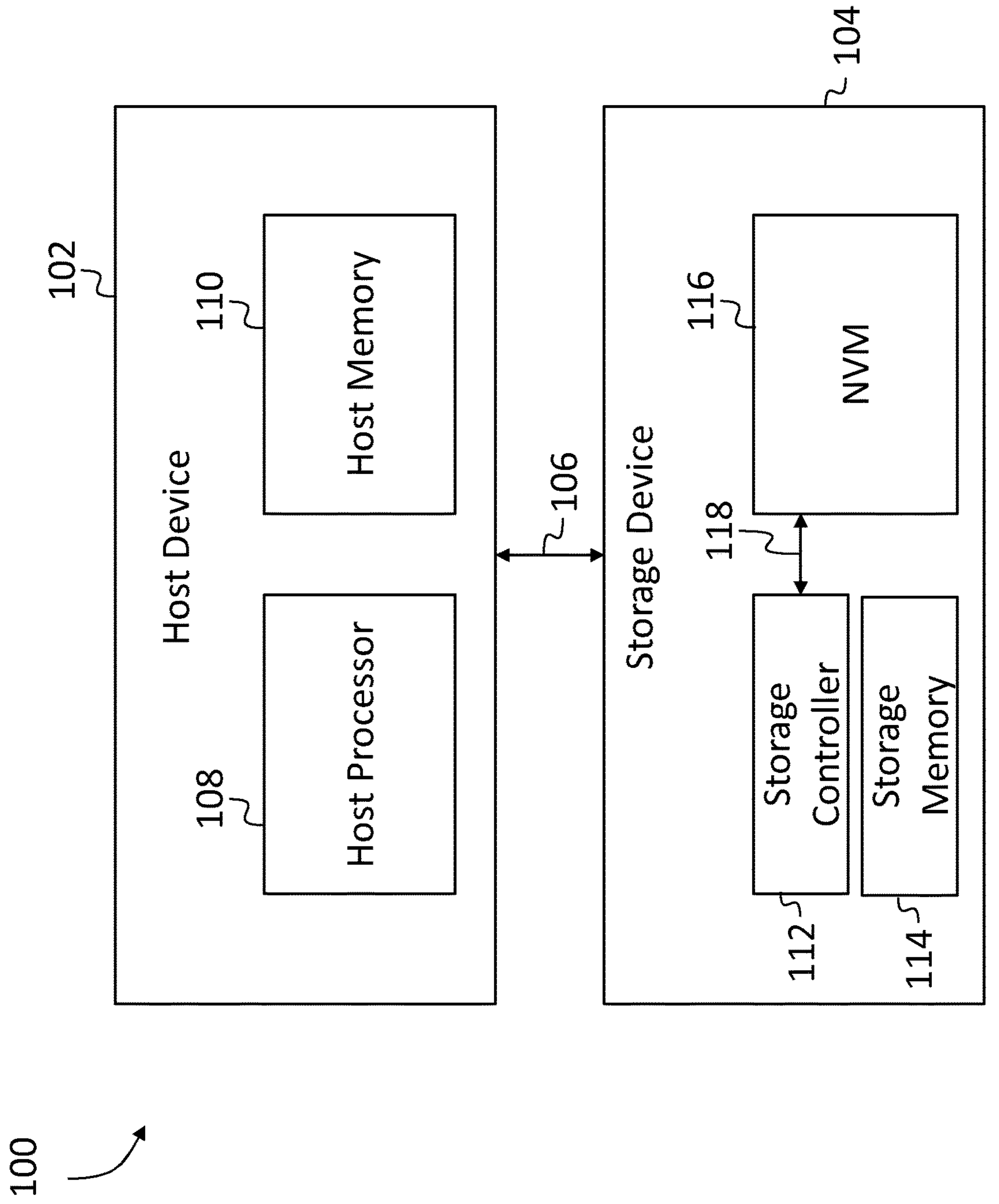
FIG. 1A is a block diagram of a host and a storage device, according to an embodiment of the present disclosure.

The detailed description set forth below in connection with the appended drawings is intended as a description of exemplary embodiments of a system and method for in-storage query execution provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In a computing system, data may be stored in key-value storage devices (which may be persistent storage devices). As used herein, "persistent" storage can include non-volatile storage, including but not limited to flash memory, erasable programmable read-only memory (EPROM), electrically erasable programmable read-only memory (EEPROM), ferroelectric random-access memory, hard disk drives, optical discs, magnetic tape, combinations thereof, and/or the like. A "persistent storage device" or "non-volatile storage device" can include (i) a device containing non-volatile storage, or (ii) a device containing one or more non-volatile storage devices. When such storage devices are employed, a host connected to such a storage device may retrieve data (e.g., an object) by sending a suitable read command to the storage device, the read command identifying the data to be read using a key (which may be part of the read command) associated with a value (e.g., the object) to be read. To perform a query on such an object, the host may (i) read the object into host memory, and (ii) perform the query on the host memory. This may be relatively burdensome for the host, and the execution speed of the query may be limited by the connection between the host and the storage device, which may be a bottleneck in such an operation.

In some embodiments, therefore, the query may instead be executed in the persistent storage device. In such an embodiment, to simplify the execution of the query, the data of the original object (which may represent a table with columns of attribute value, each column corresponding to a different attribute) may be stored in the persistent storage device as a plurality of object portions, each object portion being a columnar object (e.g., an object that contains one of the columns of the original object). Moreover, the query to be performed may be represented as a data structure, with, e.g., a field of the data structure specifying the operation to be performed (e.g., a count operation) and another field of the data structure specifying the compare operation to be performed (e.g., a less than operation). The query may then be performed in the storage device (e.g., by a configurable processing circuit of the storage device).

In some embodiments, the data and the query execution may be disaggregated over a plurality of targets, each target including a host and a storage device. As used herein, a "target" can include a computing system that includes a host and a storage device. The storage device may be considered to be a part of the host, or it may be considered to be a separate component that is connected to the host. As discussed in further detail below, a target may be connected to a server, which may delegate data processing tasks to the target. In such an embodiment each object portion may be sharded (e.g., broken into parts, which may be referred to as "shards") across the targets so that (i) the processing of a query may be performed in parallel, on multiple shards, by a respective plurality of the targets and (ii) erasure codes may be used to avoid irrecoverable data loss in the event of the loss of a storage device.

FIG. 1A illustrates a system, which may be referred to as a "target" 100, according to some embodiments of the present disclosure. Referring to FIG. 1A, the target 100 may include a host device 102 and a storage device 104 (which may be a persistent storage device 104). In some embodiments, the host device 102 may be housed with the storage device 104, and in other embodiments, the host device 102 may be separate from the storage device 104. The host device 102 may include any suitable computing device connected to a storage device 104 such as, for example, a personal computer (PC), a portable electronic device, a hand-held device, a laptop computer, or the like.

The host device 102 may be connected to the storage device 104 over a host interface 106. The host device 102 may issue data request commands or input-output (IO) commands (for example, read or write commands) to the storage device 104 over the host interface 106, and may receive responses from the storage device 104 over the host interface 106.

The host device 102 may include a host processor 108 and host memory 110. The host processor 108 may be a processing circuit (discussed in further detail below), for example, such as a general-purpose processor or a central processing unit (CPU) core of the host device 102. The host processor 108 may be connected to other components via an address bus, a control bus, a data bus, or the like. The host memory 110 may be considered as high performing main memory (for example, primary memory) of the host device 102. For example, in some embodiments, the host memory 110 may include (or may be) volatile memory, for example, such as dynamic random-access memory (DRAM). However, the present disclosure is not limited thereto, and the host memory 110 may include (or may be) any suitable high performing main memory (for example, primary memory) replacement for the host device 102 as would be known to those skilled in the art. For example, in other embodiments, the host memory 110 may be relatively high performing non-volatile memory, such as NAND flash memory, Phase Change Memory (PCM), Resistive RAM, Spin-transfer Torque RAM (STTRAM), any suitable memory based on PCM technology, memristor technology, or resistive random access memory (ReRAM), and may include, for example, chalcogenides, or the like.

The storage device 104 may operate as secondary memory that may persistently store data accessible by the host device 102. In this context, the storage device 104 may include relatively slower memory when compared to the high performing memory of the host memory 110. For example, in some embodiments, the storage device 104 may be secondary memory of the host device 102, for example, such as a Solid-State Drive (SSD). However, the present disclosure is not limited thereto, and in other embodiments, the storage device 104 may include (or may be) any suitable storage device such as, for example, a magnetic storage device (for example, a hard disk drive (HDD), or the like), an optical storage device (for example, a Blue-ray disc drive, a compact disc (CD) drive, a digital versatile disc (DVD) drive, or the like), other kinds of flash memory devices (for example, a USB flash drive, and the like), or the like. In various embodiments, the storage device 104 may conform to a large form factor standard (for example, a 3.5-inch hard drive form-factor), a small form factor standard (for example, a 2.5 inch hard drive form-factor), an M.2 form factor, an E1.S form factor, or the like. In other embodiments, the storage device 104 may conform to any suitable or desired derivative of these form factors. For convenience, the storage device 104 may be described hereinafter in the context of a solid-state drive, but the present disclosure is not limited thereto.

The storage device 104 may be communicably connected to the host device 102 over the host interface 106. The host interface 106 may facilitate communications (for example, using a connector and a protocol) between the host device 102 and the storage device 104. In some embodiments, the host interface 106 may facilitate the exchange of storage requests (or "commands") and responses (for example, command responses) between the host device 102 and the storage device 104. In some embodiments, the host interface 106 may facilitate data transfers by the storage device 104 to and from the host memory 110 of the host device 102. For example, in various embodiments, the host interface 106 (for example, the connector and the protocol thereof) may include (or may conform to) Small Computer System Interface (SCSI), Non Volatile Memory Express (NVMe), Peripheral Component Interconnect Express (PCIe), remote direct memory access (RDMA) over Ethernet, Serial Advanced Technology Attachment (SATA), Fiber Channel, Serial Attached SCSI (SAS), NVMe over Fabric (NVMe-oF), or the like. In other embodiments, the host interface 106 (for example, the connector and the protocol thereof) may include (or may conform to) various general-purpose interfaces, for example, such as Ethernet, Universal Serial Bus (USB), and/or the like.

In some embodiments, the storage device 104 may include a storage controller 112, storage memory 114 (which may also be referred to as a buffer), non-volatile memory (NVM) 116, and a storage interface 118. The storage memory 114 may be high-performing memory of the storage device 104, and may include (or may be) volatile memory, for example, such as DRAM, but the present disclosure is not limited thereto, and the storage memory 114 may be any suitable kind of high-performing volatile or non-volatile memory. The non-volatile memory 116 may persistently store data received, for example, from the host device 102. The non-volatile memory 116 may include, for example, NAND flash memory, but the present disclosure is not limited thereto, and the non-volatile memory 116 may include any suitable kind of memory for persistently storing the data according to an implementation of the storage device 104 (for example, magnetic disks, tape, optical disks, or the like).

The storage controller 112 may be connected to the non-volatile memory 116 over the storage interface 118. In the context of the SSD, the storage interface 118 may be referred to as flash channel, and may be an interface with which the non-volatile memory 116 (for example, NAND flash memory) may communicate with a processing component (for example, the storage controller 112) or other device. Commands such as reset, write enable, control signals, clock signals, or the like may be transmitted over the storage interface 118. Further, a software interface may be used in combination with a hardware element that may be used to test or verify the workings of the storage interface 118. The software may be used to read data from and write data to the non-volatile memory 116 via the storage interface 118. Further, the software may include firmware that may be downloaded onto hardware elements (for example, for controlling write, erase, and read operations).

The storage controller 112 (which may be a processing circuit (discussed in further detail below)) may be connected to the host interface 106, and may manage signaling over the host interface 106. In some embodiments, the storage controller 112 may include an associated software layer (for example, a host interface layer) to manage the physical connector of the host interface 106. The storage controller 112 may respond to input or output requests received from the host device 102 over the host interface 106. The storage controller 112 may also manage the storage interface 118 to control, and to provide access to and from, the non-volatile memory 116. For example, the storage controller 112 may include at least one processing component embedded therein for interfacing with the host device 102 and the non-volatile memory 116. The processing component may include, for example, a general purpose digital circuit (for example, a microcontroller, a microprocessor, a digital signal processor, or a logic device (for example, a field programmable gate array (FPGA), an application-specific integrated circuit (ASIC), or the like)) capable of executing data access instructions (for example, via firmware or software) to provide access to the data stored in the non-volatile memory 116 according to the data access instructions. For example, the data access instructions may correspond to the data request commands, and may include any suitable data storage and retrieval algorithm (for example, read, write, or erase) instructions, or the like.

Figure 1B:
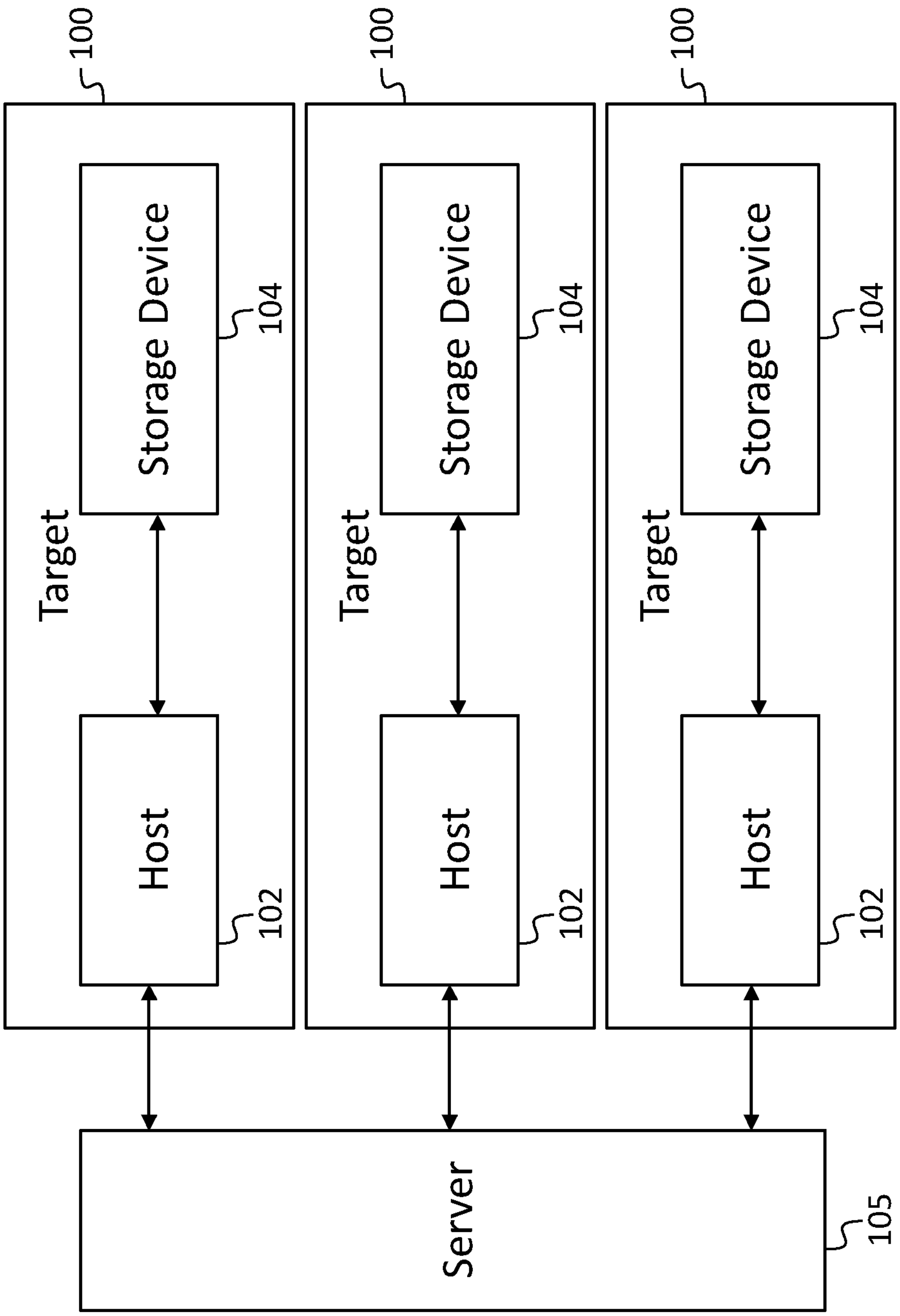
FIG. 1B is a system level block diagram, according to an embodiment of the present disclosure.

FIG. 1B is a system-level diagram, in some embodiments. Within each target 100, a host 102 is connected to a persistent storage device 104 (which may be, for example, a solid-state drive (SSD)). The persistent storage device 104 may have (as discussed above) a form factor that is any one of a plurality of form factors suitable for persistent storage devices, including but not limited to 2.5", 1.8", MO-297, MO-300, M.2, and Enterprise and Data Center SSD Form Factor (EDSFF), and it may have an electrical interface (which may be referred to as a "host interface"), through which it may be connected to the host 102, that is any one of a plurality of interfaces suitable for persistent storage devices, including Peripheral Component Interconnect (PCI), PCI express (PCIe), Ethernet, Small Computer System Interface (SCSI), Serial AT Attachment (SATA), and Serial Attached SCSI (SAS) or Universal Flash Storage (UFS). The persistent storage device 104 may include an interface circuit which operates as an interface adapter between the host interface 106 and one or more internal interfaces in the persistent storage device 104.

The host interface may be used by the host 102 to communicate with the persistent storage device 104, for example, by sending write and read commands, which may be received, by the persistent storage device 104, through the host interface. The host interface may also be used by the persistent storage device 104 to perform data transfers to and from system memory of the host 102.

Such data transfers may be performed using direct memory access (DMA). For example, when the host 102 sends a write command to the persistent storage device 104, the persistent storage device 104 may fetch the data to be written to the non-volatile memory 116 from the host memory 110 of the host device 102 using direct memory access, and the persistent storage device 104 may then save the fetched data to the non-volatile memory 116. Similarly, if the host 102 sends a read command to the persistent storage device 104, the persistent storage device 104 may read the requested data (i.e., the data specified in the read command) from the non-volatile memory 116 and save it in the host memory 110 of the host device 102 using direct memory access. The persistent storage device 104 may store data in a persistent memory, for example, not-AND (NAND) flash memory, for example, in memory dies containing memory cells, each of which may be, for example, a Single-Level Cell (SLC), a Multi-Level Cell (MLC), or a Triple-Level Cell (TLC).

A Flash Translation Layer (FTL) (discussed in further detail below) of the persistent storage device 104 may provide a mapping between logical addresses used by the host 102 and physical addresses of the data in the persistent memory. The persistent storage device 104 may also include (i) a buffer which may include (for example, consist of) dynamic random-access memory (DRAM), and (ii) a persistent memory controller (for example, a flash controller) for providing suitable signals to the persistent memory. Some or all of the host interface, the Flash Translation Layer, the buffer, and the persistent memory controller may be implemented in a processing circuit, which may be referred to as the persistent storage device controller.

Figure 1C:
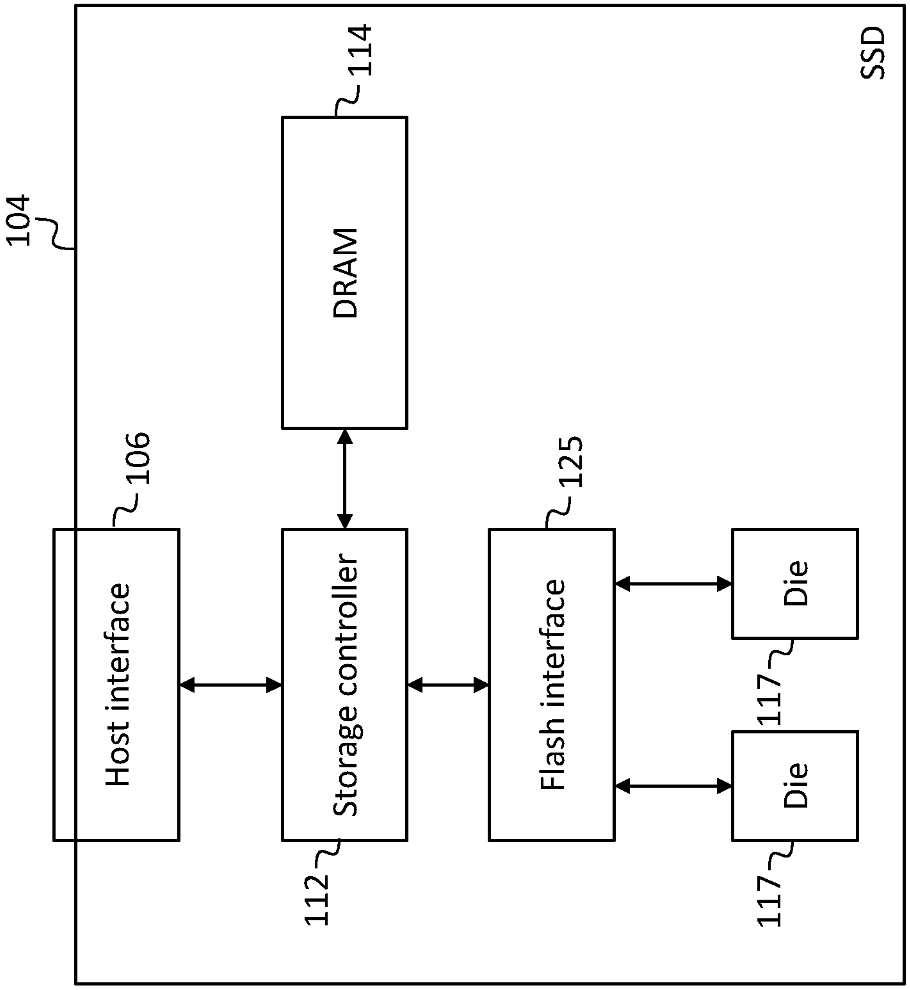
FIG. 1C is a block diagram of a storage device, according to an embodiment of the present disclosure.

FIG. 1C is a block diagram of a persistent storage device 104 (for example, a solid-state drive), in some embodiments. The host interface 106 is used by the host 102, to communicate with the persistent storage device 104. The data write and read input output commands, as well as various media management commands such as the nonvolatile memory express (NVMe) Identify command and the NVMe Get Log command may be received, by the persistent storage device 104, through the host interface 106. The host interface 106 may also be used by the persistent storage device 104 to perform data transfers to and from host system memory. The persistent storage device 104 may store data in non-volatile memory 116 (for example, not-AND (NAND) flash memory), for example, in memory dies 117 containing memory cells, each of which may be (as discussed above), for example, a Single-Level Cell (SLC), a Multi-Level Cell (MLC), or a Triple-Level Cell (TLC). A Flash Translation Layer (FTL), which may be implemented in the storage controller 112 (for example, based on firmware (for example, based on firmware stored in the non-volatile memory 116) may provide a mapping between logical addresses used by the host and physical addresses of the data in the non-volatile memory 116. The persistent storage device 104 may also include (i) a buffer (for example, the storage memory 114) (which may include, for example, consist of, dynamic random-access memory (DRAM)), and (ii) a flash interface (or "flash controller") 125 for providing suitable signals to the memory dies 117 of the non-volatile memory 116. Some or all of the host interface 106, the Flash Translation Layer (as mentioned above), the storage memory 114 (for example, the buffer), and the flash interface 125 may be implemented in a processing circuit, which may be referred to as the persistent storage device controller 112 (or simply as the storage controller 112).

The NAND flash memory may be read or written at the granularity of a flash page, which may be between 8 KB and 16 KB in size. Before the flash memory page is reprogrammed with new data, it may first be erased. The granularity of an erase operation may be one NAND block, or "physical block", which may include, for example, between 128 and 256 pages. Because the granularity of erase and program operations are different, garbage collection (GC) may be used to free up partially invalid physical blocks and to make room for new data. The garbage collection operation may (i) identify fragmented flash blocks, in which a large proportion (for example, most) of the pages are invalid, and (ii) erase each such physical block. When garbage collection is completed, the pages in an erased physical block may be recycled and added to a free list in the Flash Translation Layer.

The non-volatile memory 116 (for example, if it includes or is flash memory) may be capable of being programmed and erased only a limited number of times. This may be referred to as the maximum number of program/erase cycles (P/E cycles) the non-volatile memory 116 can sustain. To maximize the life of the persistent storage device 104, the persistent storage device controller 112 may endeavor to distribute write operations across all of the physical blocks of the non-volatile memory 116; this process may be referred to as wear leveling.

A mechanism that may be referred to as "read disturb" may reduce persistent storage device 104 reliability. A read operation on a NAND flash memory cell may cause the threshold voltage of nearby unread flash cells in the same physical block to change. Such disturbances may change the logical states of the unread cells, and may lead to uncorrectable error-correcting code (ECC) read errors, degrading flash endurance. To avoid this result, the Flash Translation Layer may have a counter of the total number of reads to a physical block since the last erase operation. The contents of the physical block may be copied to a new physical block, and the physical block may be recycled, when the counter exceeds a threshold (for example, 50,000 reads for Multi-Level Cell), to avoid irrecoverable read disturb errors. As an alternative, in some embodiments, a test read may periodically be performed within the physical block to check the error-correcting code error rate; if the error rate is close to the error-correcting code capability, the data may be copied to a new physical block.

Because of the relocation of data performed by various operations (for example, garbage collection) in the persistent storage device 104, the amount of data that is erased and rewritten may be larger than the data written to the persistent storage device 104 by the host. Each time data is relocated without being changed by the host system, a quantity referred to as "write amplification" is increased, and the life of the non-volatile memory 116 may be reduced. Write amplification may be measured as the ratio of (i) the number of writes committed to the flash memory to (ii) the number of writes coming from the host system.

The persistent storage device 104 may be configured to operate as a key-value persistent storage device 104; for example, it may be capable of storing a plurality of values (each of which may be an object) and a plurality of keys each associated with a respective value of the plurality of values. In such an embodiment, the host 102 may send a key to the persistent storage device 104 as part of a command requesting an object, and in response the persistent storage device 104 may return, to the host, the object that corresponds to the key.

In some circumstances it may be advantageous to perform queries on an object or on a portion of an object. For example, an object may store a table of values, in which each row represents an entity and each column represents a characteristic, so that the value in the $N^{th}$ column of the $M^{th}$ row is the value of the $N^{th}$ characteristic of the $M^{th}$ entity. As a more specific example, each row may be associated with an employee of a corporation, and three of the columns may be associated with the hire date of the employee, the salary of the employee and the telephone number of the employee, respectively.

The host 102 (for example, an application running on the host 102, or a user operating the host 102) may then obtain, by performing a suitable query, various types of summary information about the data stored in the object. For example, the host 102 may perform a query that counts the number of employees that were hired before a certain date. A query that performs analysis of this kind may be referred to as a select query, or as a "query for selecting one or more data elements".

A select query may be defined by (i) an operation (for example, counts, sums, averages, minimums and maximums), (ii) a data set on which the query is to be performed, (iii) a compare operation (for example, equal to, greater than, greater than or equal to, less than, less than or equal to, or contains), and (iv) a threshold value. For example, if the purpose of the query is to count the number of employees hired before Jan. 1, 2010, then the query may be specified using the following syntax:

select COUNT from employee_data where hire_date<01-01-2010.

In this example, the name of the object storing employee data is employee_data, the name of the column storing each employee's hire date is hire_date, the operation is count, the compare operation is less than, and the threshold value is Jan. 1, 2010 (or, in another date format, 01-01-2010).

To perform such a query, the host 102 may read the object (for example, employee_data) from the persistent storage device 104 (for example, by performing a key-value read command including a key corresponding to the employee data object) into the host memory 110 and the host 102 may test each element of the hire date column to determine whether it is less than (for example, before) Jan. 1, 2010, and increment a counter for each such hire date found. This process may be burdensome for the host 102, however, and the speed of execution of the query may be limited by the bandwidth (or by the bandwidth and latency) of the host interface 106.

Figure 1D:
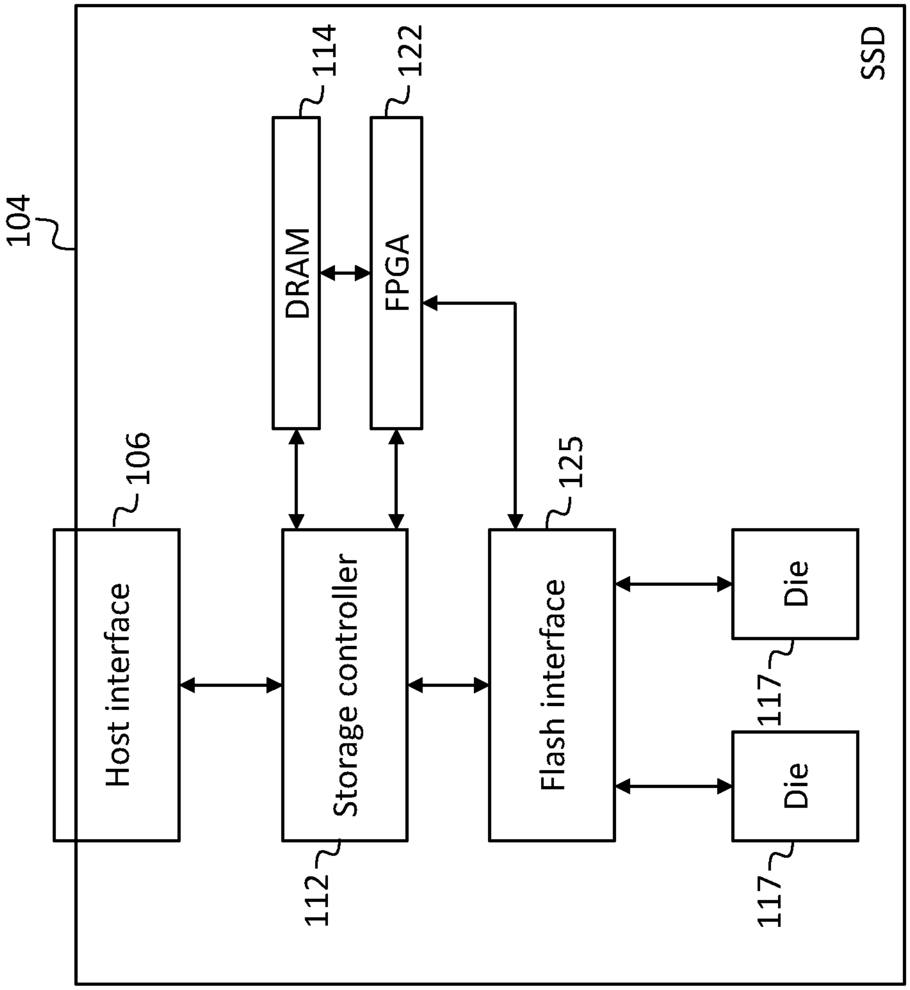
FIG. 1D is a block diagram of a storage device including a configurable processing circuit, according to an embodiment of the present disclosure.

In some embodiments, therefore, the query may instead be performed in the persistent storage device 104. The persistent storage device 104 may include a processing circuit for this purpose (for example, a configurable processing circuit 122 (for example, a field programmable gate array (FPGA)), as illustrated in FIG. 1D. The configurable processing circuit 122 may be connected to the storage controller 112, to the flash interface 125, and to the storage memory 114. Being connected together, the storage controller 112 and the configurable processing circuit 122 may be considered to be a single processing circuit. To reduce the complexity of the configurable processing circuit 122, the data may be stored in columnar form, in the non-volatile memory 116. For example, instead of the table mentioned in examples above being stored as a single object (which may be referred to herein as the "original object"), the table may be stored as a plurality of columnar objects (each of which may be referred to as an "object portion"), each being a portion of the original object (containing only the data associated with a respective one of the columns of the original object).

Moreover, the host 102 or the server 105 (FIG. 1B) may parse the query to be executed and convert it to a data structure representation, in which the fields of the data structure store values that are, or that identify, (i) the operation, (ii) the compare operation, and (iii) the threshold value. The identifying of the data set may be done by specifying a key, because for an original object that is stored as a plurality of columnar objects, a key is associated with each columnar object. The data structure may further include a field specifying the data type of the data on which the query is to be performed and the data type of the threshold value (which may be the same as the data type of the data on which the query is to be performed). This representation of the query (as a data structure) may make possible further simplification of the configurable processing circuit 122.

In operation, the configurable processing circuit 122 may (i) read a columnar object, a few elements at a time, into the storage memory 114, (ii) test each according to a criterion corresponding to the compare operation (for example, less than) and the threshold value (for example, Jan. 1, 2010) and (iii) perform the operation (for example, increment a counter) for each element that meets the criterion. When all of the data of the column has been processed, the configurable processing circuit 122 may return the result (for example, the count) to the storage controller 112, which may return it to the host 102.

Such an embodiment may (i) significantly reduce the burden on the host 102, and it may (ii) significantly speed the execution of the query, by making it unnecessary to transfer a potentially large amount of data to the host memory 110 of the host device 102.

In some embodiments, a plurality of targets 100 may be connected to a server 105 as illustrated in FIG. 1B. Each of the targets 100 may include a persistent storage device 104 that includes a configurable processing circuit 122 (as, for example, the persistent storage device 104 illustrated in FIG. 1D), and, as such, each of the targets 100 may be capable of executing queries efficiently in its respective persistent storage device 104. The server 105 may manage the storage of objects (for example, storing each original object as a plurality of columnar objects) and the execution of queries. In such an embodiment, each target may use a computational storage (CS) application programming interface (API) and a suitable run time interface (for example, Xilinx™ run time (XRT)) to cause the persistent storage device 104 of the target 100 to perform in-storage query execution (for example, to perform query execution in the persistent storage device 104). The individual results are returned back to the target 100, then to the host server 105, where they are accumulated to form the final result which is then returned back to the end application.

In some embodiments, each columnar object is stored in a disaggregated manner on the targets 100, as a plurality of shards, each shard being stored on one of the targets. The shards may be stored as data shards and erasure code shards. For example, a columnar object may be divided up into a plurality of shards, and the shards may be grouped into groups, each group containing a plurality of data shards (for example, seven data shards) and each group further containing one or more erasure code shards (for example, an erasure code shard containing parity data or other redundant data). The shards of each group may be stored on different respective targets 100; for example, in a system with eight targets 100, each of the eight shards of a group (the group including seven data shards and one erasure code shard) may be stored on a different respective target 100 of the eight targets 100. This manner of storing the data shards may make it possible to recreate any single lost shard (or any larger subset of the data shards (for example, any two lost shards)) from the surviving shards and the erasure code shard or shards. As mentioned above, each shard of the group, and the erasure code shard or shards, may be stored on different targets, so that it may be possible, in the event of the failure of one target, to recover all of the data. The size of the shards may be selected to be (i) sufficiently small to result in the shards being relatively evenly distributed over the targets (ii) sufficiently small to be conveniently handled by the input and output commands supported by the host interface 106, and (iii) sufficiently large that the overhead of handling the shards does not significantly degrade the performance of the system. In some embodiments the shards have size between 10 kilobytes and 100 megabytes (e.g., a size of 1 megabyte).

When a query is to be executed, the query may be executed in parallel on all of the targets 100, each target 100 performing the query (for example, one shard at a time) on all of the shards, of the columnar object on which the query is being performed, that are stored on the target 100.

In an embodiment in which, for example, one target 100 is dedicated for storing all of the erasure code shards, this target 100 may not participate in the execution of a query, and instead the targets 100 that store the data shards may execute the query. As such, in such a configuration, the target 100 that stores the erasure code shards may be underutilized, especially if it includes a persistent storage device 104 including a configurable processing circuit 122.

In some embodiments, therefore, the shards formed from a columnar object are stored on the targets 100 such that the target 100 or targets 100 storing the erasure code shard or shards rotate with each group of shards stored. For example, if the system includes eight targets 100 and each group of shards includes seven data shards and one erasure code shard, then, for example, the erasure code shard of the first group of shards may be stored on a first target 100 (and the data shards of the first group of shards may be stored on the remaining seven targets 100), the erasure code shard of the second group of shards may be stored on a second target 100 (and the data shards of the second group of shards may be stored on (i) the first target and (ii) the remaining six targets 100), and so forth. Storing the shards in this manner may make it possible for all of the targets to participate in the execution of the query. Once a query has been executed on each of the targets 100, each target may send its respective query result to the server 105, and the server 105 may form a final query result based on the query results received from the targets 100 (for example, it may collect and merge the results (for example, by summing all of the respective counts obtained by the targets 100 to form a final count value)).

In some embodiments, a target 100 may include more than one persistent storage device 104, each including a configurable processing circuit 122. In some such embodiments, the target 100 may include a sufficient number of persistent storage devices 104 to perform disaggregated storage and queries without the need for other targets 100 or a server 105. The target 100 may, in such an embodiment, perform the operations performed by the server 105 in the embodiment of FIG. 1B (for example, the target may store a columnar object in shards on the persistent storage devices 104), coordinate the running of queries, and gather and merge the query results.

In some embodiments, the configurable processing circuit 122 is reconfigurable after the persistent storage device 104 is manufactured (for example, if the configurable processing circuit 122 is an FPGA). In such an embodiment, it may be possible to modify the operation by reprogramming the configurable processing circuit 122, for example, to adapt to changing interface standards for the host interface 106, or to adapt to new requirements for queries to be performed.

Figure 2:
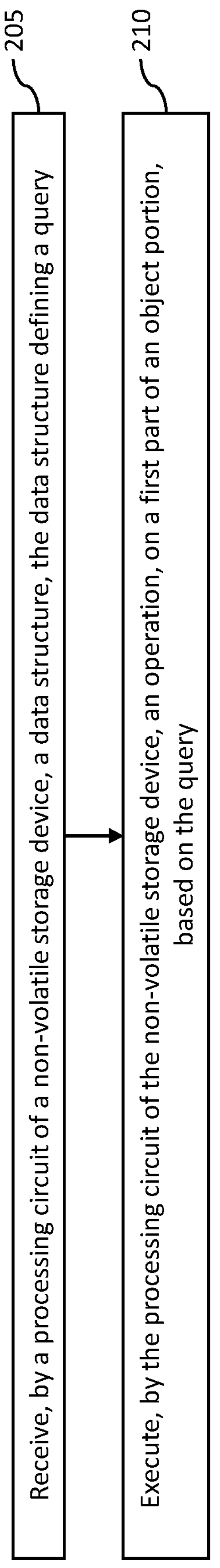
FIG. 2 is a flow chart of a method, according to an embodiment of the present disclosure.

FIG. 2 shows a flowchart of a method, in some embodiments. The method, includes: receiving, at 205, by a processing circuit of a non-volatile storage device, a data structure, the data structure defining a query; and executing, at 210, by the processing circuit of the non-volatile storage device, an operation, on a first part of an object portion, based on the query, wherein the non-volatile storage device includes non-volatile memory storing the first part of the object portion. In some embodiments: the query is a query for selecting one or more data elements; the data structure includes a first field having a first value; and the first value defines a first characteristic of the query. In some embodiments: the query is a query for selecting one or more data elements; the data structure includes a first field having a first value; the first value defines a first characteristic of the query; and the first characteristic is an operation of the query.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X−Y and the second quantity is at most X+Y. As used herein, when a second number is "within Y %" of a first number, it means that the second number is at least (1−Y/100) times the first number and the second number is at most (1+Y/100) times the first number. As used herein, the term "or" should be interpreted as "and/or", such that, for example, "A or B" means any one of "A" or "B" or "A and B".

The background provided in the Background section of the present disclosure section is included only to set context, and the content of this section is not admitted to be prior art. Any of the components or any combination of the components described (e.g., in any system diagrams included herein) may be used to perform one or more of the operations of any flow chart included herein. Further, (i) the operations are example operations, and may involve various additional steps not explicitly covered, and (ii) the temporal order of the operations may be varied.

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., (1−35/100) times 10) and the recited maximum value of 13.5 (i.e., (1+35/100) times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

Some embodiments may include features of the following numbered statements.

1. A system, comprising:
 a non-volatile storage device, comprising:
  non-volatile memory; and
  a processing circuit,
 wherein:
  the non-volatile memory of the non-volatile storage device stores a first part of an object portion; and
  the processing circuit of the non-volatile storage device is configured:
   to receive a data structure, the data structure defining a query; and
   to execute an operation, on the first part of the object portion, based on the query.

2. The system of statement 1, wherein:
 the non-volatile memory of the non-volatile storage device stores a second part of the object portion; and
 the processing circuit of the non-volatile storage device is configured:
  to receive the data structure; and
  to execute an operation, on the second part of the object portion, based on the query.

3. The system of statement 1 or statement 2, wherein the non-volatile memory of the non-volatile storage device stores an erasure code part associated with the first part of the object portion.

4. The system of any one of the preceding statements, wherein the query is a query for selecting one or more data elements.

5. The system of any one of the preceding statements, wherein:
 the query is a query for selecting one or more data elements;
 the data structure comprises a first field having a first value; and
 the first value defines a first characteristic of the query.

6. The system of any one of the preceding statements, wherein:
 the query is a query for selecting one or more data elements;
 the data structure comprises a first field having a first value;

the first value defines a first characteristic of the query; and the first characteristic is an operation of the query.

7. The system of any one of the preceding statements, wherein:

the query is a query for selecting one or more data elements;

the data structure comprises a first field having a first value;

the first value defines a first characteristic of the query;

the first characteristic is an operation of the query; and the operation includes one or more of counts, sums, averages, minimums and maximums.

8. The system of any one of the preceding statements, wherein:

the object portion comprises a value of a first attribute;

the query is a query for selecting one or more data elements;

the data structure comprises a first field having a first value;

the value of the first field defines a first characteristic of the query; and the first characteristic is a data type of the value of the first attribute.

9. The system of any one of the preceding statements, wherein:

the query is a query for selecting one or more data elements;

the data structure comprises a first field having a first value;

the first value defines a first characteristic of the query; and the first characteristic is a compare operation of the query.

10. The system of any one of the preceding statements, wherein:

the query is a query for selecting one or more data elements;

the data structure comprises a first field having a first value;

the first value defines a first characteristic of the query;

the first characteristic is a compare operation of the query; and the compare operation is selected from the group consisting of equal to, greater than, greater than or equal to, less than, less than or equal to, and contains.

11. The system of any one of the preceding statements, wherein:

the query is a query for selecting one or more data elements;

the data structure comprises a first field having a first value;

the first value defines a first characteristic of the query; and the first characteristic is a threshold value of the query.

12. A non-volatile storage device, comprising:

non-volatile memory; and a processing circuit, the non-volatile memory storing a first part of an object portion;

the non-volatile memory further storing instructions that, when executed by the processing circuit, cause the processing circuit to perform a method, the method comprising:

receiving a data structure, the data structure defining a query; and executing an operation, on the first part of the object portion, based on the query.

13. The non-volatile storage device of statement 12, wherein the non-volatile memory of the non-volatile storage device stores an erasure code part associated with the first part of the object portion.

14. The non-volatile storage device of statement 12 or statement 13, wherein the query is a query for selecting one or more data elements.

15. The non-volatile storage device of any one of the preceding statements, wherein:

the query is a query for selecting one or more data elements;

the data structure comprises a first field having a first value; and the first value defines a first characteristic of the query.

16. The non-volatile storage device of any one of the preceding statements, wherein:

the query is a query for selecting one or more data elements;

the data structure comprises a first field having a first value;

the first value defines a first characteristic of the query; and the first characteristic is an operation of the query.

17. The non-volatile storage device of any one of the preceding statements, wherein:

the query is a query for selecting one or more data elements;

the data structure comprises a first field having a first value;

the first value defines a first characteristic of the query;

the first characteristic is an operation of the query; and the operation is selected from the group consisting of counts, sums, averages, minimums and maximums.

18. A method, comprising:

receiving, by a processing circuit of a non-volatile storage device, a data structure, the data structure defining a query; and executing, by the processing circuit of the non-volatile storage device, an operation, on a first part of an object portion, based on the query, wherein the non-volatile storage device comprises non-volatile memory storing the first part of the object portion.

19. The method of statement 18, wherein:

the query is a query for selecting one or more data elements;

the data structure comprises a first field having a first value; and the first value defines a first characteristic of the query.

20. The method of statement 18 or statement 19, wherein:

the query is a query for selecting one or more data elements;

the data structure comprises a first field having a first value;

the first value defines a first characteristic of the query; and the first characteristic is an operation of the query.

Although exemplary embodiments of a system and method for in-storage query execution have been specifically described and illustrated herein, many modifications and variations will be apparent to those skilled in the art. Accordingly, it is to be understood that a system and method for in-storage query execution constructed according to principles of this disclosure may be embodied other than as specifically described herein. The invention is also defined in the following claims, and equivalents thereof.

What is claimed is:

1. A system, comprising:

a non-volatile storage device, comprising:

a non-volatile memory device storing data in an object portion; and a processing circuit, wherein the processing circuit of the non-volatile storage device is configured:

to receive a query; and to execute the query on the data in a first part of the object portion, the object portion corresponding to a column of a table, wherein:

the query is represented as a data structure;

the data structure comprises a first field having a first value; and the first value defines a first characteristic of the query.

2. The system of claim 1, wherein the non-volatile memory device of the non-volatile storage device stores an erasure code part associated with the first part of the object portion.

3. The system of claim 1, wherein the query is a query for selecting one or more data elements.

4. The system of claim 1, wherein:

the query is a query for selecting one or more data elements; and the first characteristic is an operation of the query.

5. The system of claim 1, wherein:

the query is a query for selecting one or more data elements;

the first characteristic is an operation of the query; and the operation includes one or more of counts, sums, averages, minimums and maximums.

6. The system of claim 1, wherein:

the object portion comprises a value of a first attribute;

the query is a query for selecting one or more data elements; and the first characteristic is a data type of the value of the first attribute.

7. The system of claim 1, wherein:

the query is a query for selecting one or more data elements; and the first characteristic is a compare operation of the query.

8. The system of claim 1, wherein:

the query is a query for selecting one or more data elements;

the first characteristic is a compare operation of the query; and the compare operation is selected from the group consisting of equal to, greater than, greater than or equal to, less than, less than or equal to, and contains.

9. The system of claim 1, wherein:

the query is a query for selecting one or more data elements; and the first characteristic is a threshold value of the query.

10. A method, comprising:

receiving, by a processing circuit of a non-volatile storage device, a query; and executing, by the processing circuit of the non-volatile storage device, the query, on data stored in a first part of an object portion, the object portion corresponding to a column of a table, wherein the non-volatile storage device comprises a non-volatile memory device storing the data in the object portion, the query is represented as a data structure;

the data structure comprises a first field having a first value; and the first value defines a first characteristic of the query.

11. The method of claim 10, wherein:

the query is a query for selecting one or more data elements.

12. The method of claim 10, wherein:

the query is a query for selecting one or more data elements; and the first characteristic is an operation of the query.

* * * * *